(12) United States Patent
Dezse

(10) Patent No.: US 10,347,060 B2
(45) Date of Patent: Jul. 9, 2019

(54) ELECTRONIC CARD ACCESS SYSTEM, AND ACCESS CARD

(71) Applicant: Microcom Corporation, Lewis Center, OH (US)

(72) Inventor: David M. Dezse, Lewis Center, OH (US)

(73) Assignee: MICROCOM CORPORATION, Lewis Center, OH (US)

( * ) Notice: Subject to any disclaimer, the term of this patent is extended or adjusted under 35 U.S.C. 154(b) by 0 days.

(21) Appl. No.: 15/727,004

(22) Filed: Oct. 6, 2017

(65) Prior Publication Data

US 2018/0102004 A1 Apr. 12, 2018

Related U.S. Application Data

(60) Provisional application No. 62/404,996, filed on Oct. 6, 2016.

(51) Int. Cl.

| | |
|---|---|
| *G06K 7/10* | (2006.01) |
| *G06K 7/14* | (2006.01) |
| *G07C 9/00* | (2006.01) |
| *G06K 19/07* | (2006.01) |
| *G06K 19/06* | (2006.01) |
| *G06K 19/12* | (2006.01) |
| *G06K 19/14* | (2006.01) |
| *G07C 9/02* | (2006.01) |
| *G07C 11/00* | (2006.01) |

(52) U.S. Cl.
CPC ..... *G07C 9/00055* (2013.01); *G06K 7/10297* (2013.01); *G06K 7/10782* (2013.01); *G06K 7/1417* (2013.01); *G06K 19/06187* (2013.01); *G06K 19/0723* (2013.01); *G06K 19/12* (2013.01); *G06K 19/14* (2013.01); *G07C 9/00103* (2013.01); *G07C 9/00119* (2013.01); *G07C 9/00571* (2013.01); *G07C 9/025* (2013.01); *G07C 9/00658* (2013.01); *G07C 9/00722* (2013.01); *G07C 2011/02* (2013.01)

(58) Field of Classification Search
USPC .................................................. 235/382, 487
See application file for complete search history.

(56) References Cited

U.S. PATENT DOCUMENTS

| | | | | |
|---|---|---|---|---|
| 6,068,183 | A * | 5/2000 | Freeman ............ | G06K 19/0723 235/375 |
| 2005/0092844 | A1* | 5/2005 | Zhang .................. | G06K 7/0004 235/487 |
| 2007/0101002 | A1* | 5/2007 | Skutela .................. | G06Q 10/06 709/227 |
| 2008/0071537 | A1* | 3/2008 | Tamir .................. | G07C 9/00087 704/246 |
| 2009/0133111 | A1* | 5/2009 | Evans ................ | G07C 9/00087 726/9 |
| 2014/0158768 | A1* | 6/2014 | Ray ........................ | H04K 3/825 235/449 |
| 2015/0295919 | A1* | 10/2015 | Van Kerrebroeck ...................... | H04L 63/0853 726/9 |
| 2016/0019531 | A1* | 1/2016 | Gormley .............. | G06Q 20/405 705/72 |

* cited by examiner

*Primary Examiner* — Allyson N Trail
(74) *Attorney, Agent, or Firm* — Vorys, Sater, Seymour and Pease LLP; William L. Klima

(57) ABSTRACT

An electronic card access system, for example, for managing access control of a venue or facility, and an access card for use with the card access system.

20 Claims, 3 Drawing Sheets

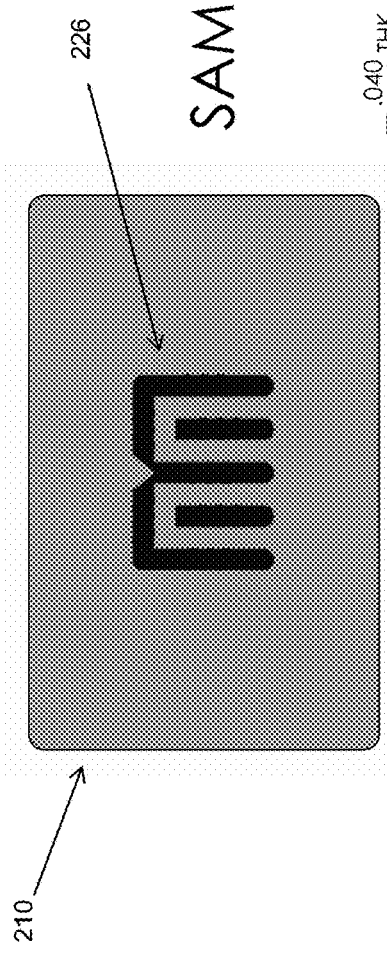
*FIG. 4*
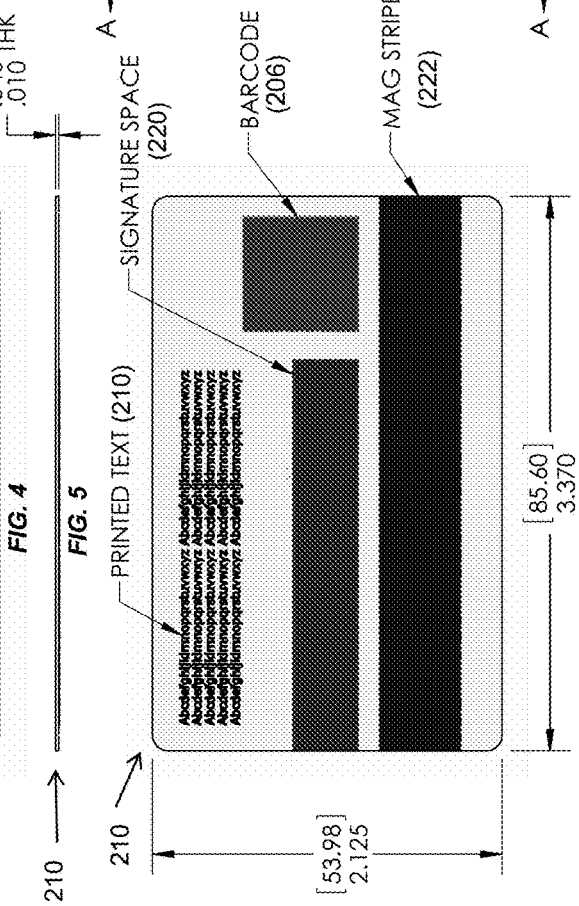
*FIG. 5*
*FIG. 6*
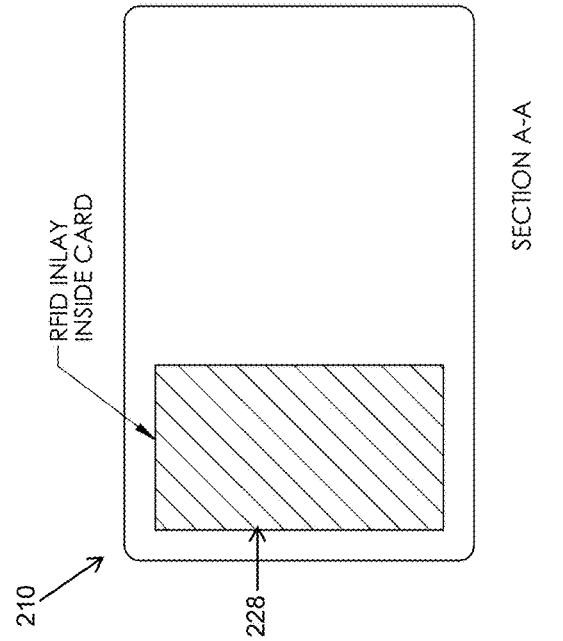
*FIG. 7*
*FIG. 8*

ELECTRONIC CARD ACCESS SYSTEM, AND ACCESS CARD

FIELD

The present invention is directed to an electronic card access system, for example, for managing access control of a venue or facility, and an access card for use with the card access system.

BACKGROUND

There exist many different systems and equipment for controlling access to a venue or facility such as a theme park. There exists a need to provide an improved controlled access system.

In modern access control, it is common to issue a card which can be tapped or otherwise read to open gates, doors or similar. Most of these cards are issued via an on demand printer. Some cards are issued without a printer, but have a unique text printed on the card, but this text is not machine readable such as a QR, for example. Also this card does not have any identity verification such as a signature which can be used to detect fraud.

The disclosed invention eliminates the need for printing at all, speeding up the issuance, and reducing the cost of implementation.

SUMMARY

The present invention is directed to an improved card access system.

The present invention is direct to a card access system configured to verify payment and identity of a user to control access to a venue or facility.

The present invention is directed to an improved card for use with a card access system.

The present invention is directed to an improved access card having pre-printed or pre-programmed information contained therein.

The present invention is directed to an improved access card having pre-printed or pre-programmed information contained therein, and configured to receive printed or programmed information at an issuance location.

The present invention is directed to an improved access card having pre-printed or pre-programmed information contained therein, and configured to receive printed or programmed information at an issuance location and/or a control access location.

The present invention is directed to an improved access card having pre-printed or pre-programmed information contained therein, and configured to receive printed or programmed information at both an issuance location and a control access location.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and, wherein the electronic component is an RFID tag.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and wherein in addition to the UID and user identity, a user validation is also captured and transmitted to the database.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein in addition to the UID and user identity, a user validation is also captured and transmitted to the database, and wherein the user validation is a user's signature applied to the card.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and wherein the electronic component is an electronic chip.

The presently described subject matter is directed to card system for managing access control, the system comprising: a preprinted card, comprising: an electronic component having a unique identifier (UID); a printed repeating indicia on one or both sides of the card; a variable machine readable indicia containing the UID; a signature zone; a validation device, comprising: a transporter configured for moving the card; an electronic UID reader configured to read the electronic UID; an indicia capturing device configured to capture an image of the machine readable indicia and transmitting the image to an external vision processor along with the electronic UID; an external reader configured for reading the machine readable indicia; a comparator configured for comparing the UID from the electronic component with the machine readable indicia UID; a communication device configured for communicating results of comparison of the UIDs to a point of issuance; a reader configured for reading the UID and/or the machine readable indicia UID at various controlled access points throughout the property; and a database in electronic communication with the reader, wherein access is determined by the interpreting the database for each UID.

The presently described subject matter is directed to card system for managing access control, the system comprising: a preprinted card, comprising: an electronic component having a unique identifier (UID); a printed repeating indicia on one or both sides of the card; a variable machine readable indicia containing the UID; a signature zone; a validation device, comprising: a transporter configured for moving the card; an electronic UID reader configured to read the electronic UID; an indicia capturing device configured to capture an image of the machine readable indicia and transmitting the image to an external vision processor along with the electronic UID; an external reader configured for reading the machine readable indicia; a comparator configured for comparing the UID from the electronic component with the machine readable indicia UID; a communication device configured for communicating results of comparison of the UIDs to a point of issuance; a reader configured for reading the UID and/or the machine readable indicia UID at various controlled access points throughout the property; and a database in electronic communication with the reader, wherein access is determined by the interpreting the database for each UID, and wherein the electronic component is an RFID tag.

The presently described subject matter is directed to card system for managing access control, the system comprising: a preprinted card, comprising: an electronic component having a unique identifier (UID); a printed repeating indicia on one or both sides of the card; a variable machine readable indicia containing the UID; a signature zone; a validation device, comprising: a transporter configured for moving the card; an electronic UID reader configured to read the electronic UID; an indicia capturing device configured to capture an image of the machine readable indicia and transmitting the image to an external vision processor along with the electronic UID; an external reader configured for reading the machine readable indicia; a comparator configured for comparing the UID from the electronic component with the machine readable indicia UID; a communication device configured for communicating results of comparison of the UIDs to a point of issuance; a reader configured for reading the UID and/or the machine readable indicia UID at various controlled access points throughout the property; and a database in electronic communication with the reader, wherein access is determined by the interpreting the database for each UID, and wherein in addition to the UID and user identity, a user validation is also captured and transmitted to the database.

The presently described subject matter is directed to card system for managing access control, the system comprising: a preprinted card, comprising: an electronic component having a unique identifier (UID); a printed repeating indicia on one or both sides of the card; a variable machine readable indicia containing the UID; a signature zone; a validation device, comprising: a transporter configured for moving the card; an electronic UID reader configured to read the electronic UID; an indicia capturing device configured to capture an image of the machine readable indicia and transmitting the image to an external vision processor along with the electronic UID; an external reader configured for reading the machine readable indicia; a comparator configured for comparing the UID from the electronic component with the machine readable indicia UID; a communication device configured for communicating results of comparison of the UIDs to a point of issuance; a reader configured for reading the UID and/or the machine readable indicia UID at various controlled access points throughout the property; and a database in electronic communication with the reader, wherein access is determined by the interpreting the database for each UID, and wherein the user validation is a user's signature applied to the card.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein the machine readable indicia UID is a card identification number.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein the printed indicia is repeating indicia.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and wherein the machine readable indicia UID is a card identification number.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and wherein the access card reader comprises a printer for printing on the access card.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein the machine readable indicia UID is a card identification number, and wherein the access card reader comprises a printer for printing on the access card.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein the machine readable indicia UID is a card identification number, wherein the access card reader comprises a printer for printing on the access card, and wherein the card identification number is printed on the access card by the printer of the access card reader.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and wherein at least some features of the access card are printed at a purchase/issue location.

The presently described subject matter is directed to a card access system for managing access control of a property, the system comprising: an access card, comprising: an electronic component comprising a unique identifier (UID); a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein at least some features of the access card are printed at an access terminal.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, and wherein at least some features of the access card are printed at a purchase/issue location.

The presently described subject matter is directed to a card access system for managing access control of a property, the system comprising: a preprinted access card, comprising: an electronic component having a unique identifier (UID); printed indicia on one or both sides of the card; a variable machine readable indicia containing the UID; and a signature zone; and a validation device, comprising: an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID; a comparator configured for comparing the electronic component UID to the machine readable indicia UID; and a communication device configured to communicate the UID, along with a user identity and access rights to a database, wherein access is determined by interpreting the database for each UID, wherein at least some features of the access card are printed at an access terminal.

BRIEF DESCRIPTION OF DRAWINGS

FIG. 4 is a front view of another access card according to the present invention.

FIG. 5 is a top view of the access card shown in FIG. 4.

FIG. 6 is a rear view of the access card shown in FIG. 4.

FIG. 7 is an end view of the access card shown in FIG. 4.

FIG. 8 is a top view of the access card shown in FIG. 4 revealing the RFID inlay located inside card.

DETAILED DESCRIPTION

Figure 1:
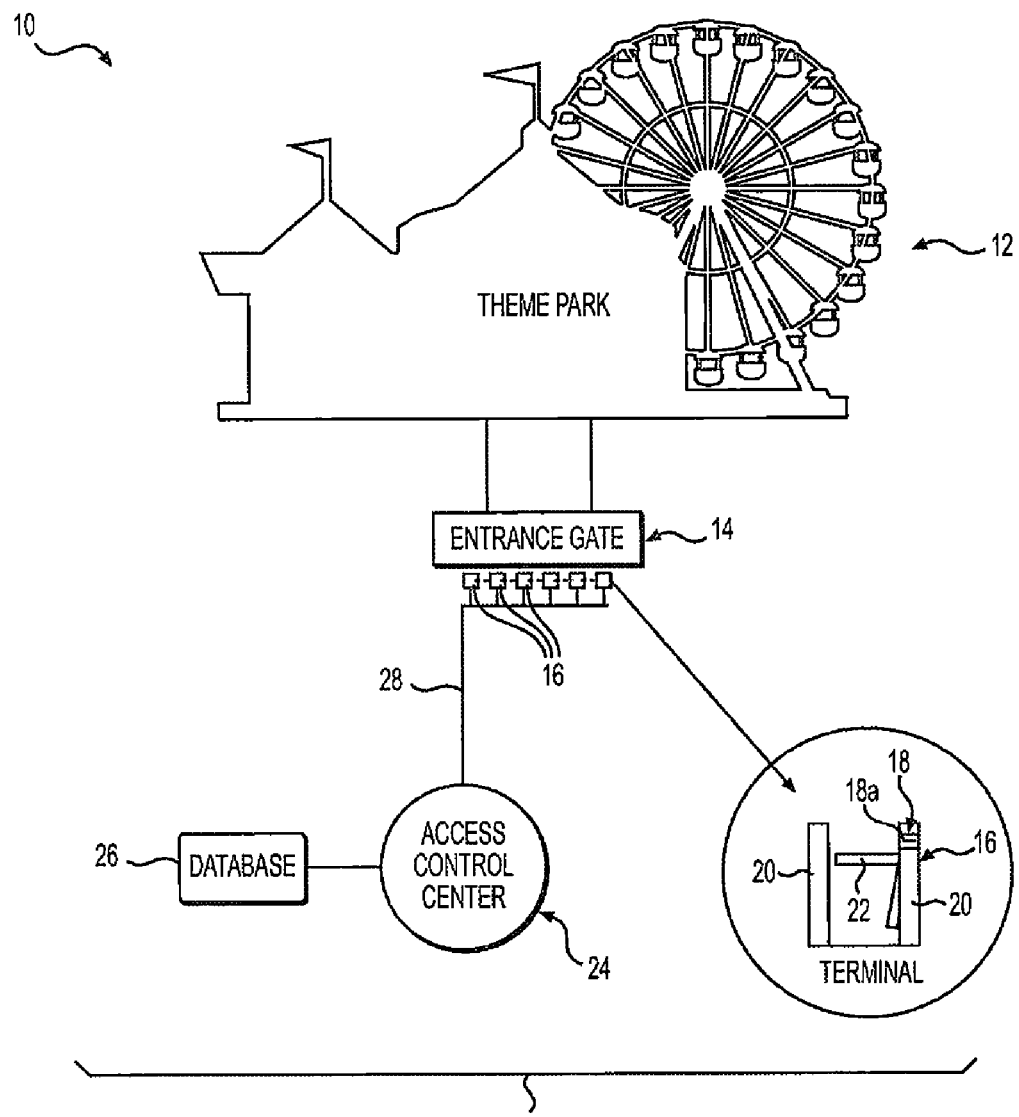
FIG. 1 is a diagrammatic view of a card access system according to the present invention.

A card access system 10 is shown in FIG. 1. The card access system 10 can be installed at a venue 12, for example, such as a building, facility, site, park, amusement park, or theme park.

The card access system 10 can be configured to control access to the venue 12 through gates and/or doors. For example, the card access system comprises an entrance gate 14 having multiple terminals 16 can be installed to provide controlled access to the venue 12.

The terminals 16 each comprise a card reader 18 having a card slot 18a. The card reader is integrated into the turnstile 20 having movable access control gate 22. The card reader 18 can have read/write devices and an optionally a printer (e.g. thermal printer) for printing on the access cards 110 and 210 (FIGS. 3-8).

The card access system 10 further comprises an access control center 24 and a database 26. The database 26 can be integrated into the access control center 24 or located at one or more remote locations. The access control center 24 can be located on the premises of the venue 12, and/or located at one or more remote locations.

The terminals 16 can be connected to the access control center 24 via a cable 28, and/or can be configured to communicate with the access control center 24 wirelessly (e.g. via a Local Area Network (LAN), cellular transmission, satellite link, Internet link, microwave transmission, or other suitable wireless communication system or network).

The access control center can comprise one or more servers configured to receive information from the terminals 16, and communicate and control the terminals to control access through each terminal 16 into the entrance gate 14 of the venue 12.

ACCESS CARD

Figure 2:
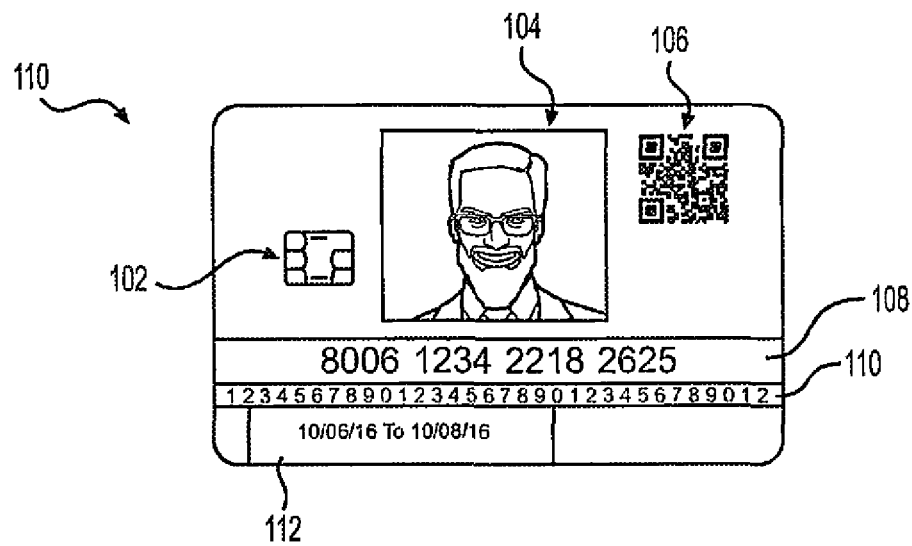
FIG. 2 is a front view of an access card according to the present invention having a number of security features.
Figure 3:
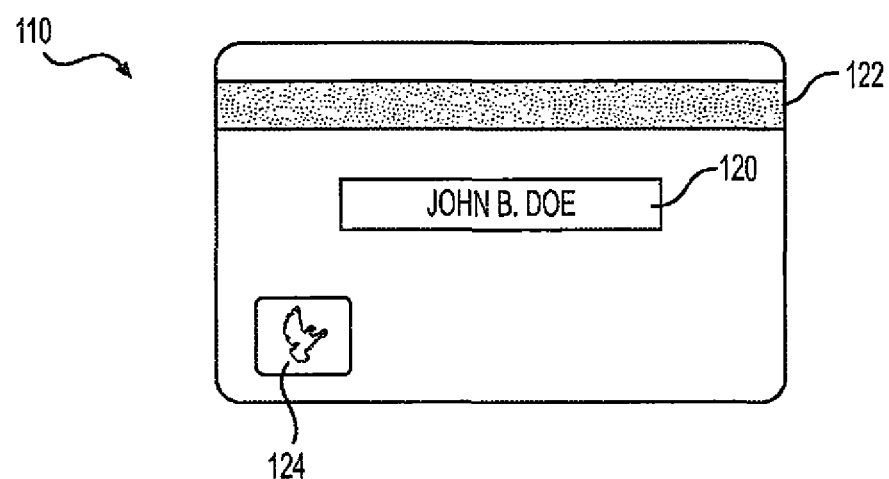
FIG. 3 is a rear view of the access card shown in FIG. 2, also having a number of security features.

The card access system 10 further comprises a user being issued an access card 110, as shown in FIGS. 2 and 3. For example, the access card 110 is issued upon the user making payment for admission to the venue 12 at the location of the venue 12, or at one or more remote locations.

The access card 110 is provided with multiple security features to verify the payment and identity of the user to control the user's access to the venue 12. For example, on the front side of the access card 110 (FIG. 2) there exist the following features:

1) an electronic chip 102 configured for containing information and/or providing electronic communication, security, and controlled access using the access card 110;

2) a picture 104 (e.g. black and white or colored picture) of the face of the user;

3) a two-dimensional or matrix barcode 106 containing information and electronically readable by a bar code scanner;

4) a zone or box or strip 108 containing a card identification number;

5) a zone or box or strip 110 of repeating numbers/letters;

6) a zone or box or strip 112 indicating the date or dates of admission to the venue 12;

On the rear side of the access card 110 (FIG. 3) there exist the following features:

7) a zone or box or strip 120 for receiving the signature of the user;

8) a magnetic strip 122 containing information and electronically readable by a magnetic strip reader; and 9) a hologram 124 to indicate the access card 110 is authentic.

The access card 110 can also be provided with a Radio Frequency I.D. (RFID) tag or insert located on a surface or inside the access card 110 (e.g. located between layers of the access card 110 having two or more plys or layers).

The picture 104, barcode 106, card I.D. 108, repeating information 110, and date information 112 can be printed on the access card 110. Some of these features can be pre-printed, printed at a purchase/issuance booth, and/or printed at a terminal 16, and can be both general and/or specific to the user (e.g. user's identification).

Another embodiment of the access card 210 is shown in FIGS. 4-8. The access card 210 is provided with multiple security features to verify the payment and identity of the user to control the user's access to the venue 12. For example, on the front side of the access card 210 (FIG. 4) there exist the following features:

1) a logo 224;

On the rear side of the access card 210 (FIG. 6) there exist the following features:

2) barcode 206;

3) repeated text 210;

4) signature space 220;

5) magnetic stripe 222; and

On the inside of the access card 210 (FIG. 8) is the following feature:

6) RFID inlay 228.

The invention claimed is:

1. A card access system for managing access control of a property, the system comprising:
   a preprinted access card, comprising:
      an electronic component having a unique identifier (UID);
      printed indicia on one or both sides of the card;
      a variable machine readable indicia containing the UID; and
      a signature zone; and
   a validation device, comprising:
      an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID;
      a comparator configured for comparing the electronic component UID to the machine readable indicia UID; and
      a communication device configured to communicate the UID, along with a user identity and access rights to a database,
   wherein access is determined by interpreting the database for each UID.

2. The system according to claim 1, wherein the electronic component is an RFID tag.

3. The system according to claim 1, wherein in addition to the UID and user identity, a user validation is also captured and transmitted to the database.

4. The system according to claim 3, wherein the user validation is a user's signature applied to the card.

5. The system according to claim 1, wherein the electronic component is an electronic chip.

6. The system according to claim 1, wherein the machine readable indicia UID is a card identification number.

7. The system according to claim 1, wherein the printed indicia is repeating indicia.

8. The system according to claim 1, wherein at least some features of the access card are printed at a purchase/issue location.

9. The system according to claim 1, wherein at least some features of the access card are printed at an access terminal.

10. A card system for managing access control, the system comprising:
   a preprinted card, comprising:
      an electronic component having a unique identifier (UID);
      a printed repeating indicia on one or both sides of the card;
      a variable machine readable indicia containing the UID;
      a signature zone;
   a validation device, comprising:
      a transporter configured for moving the card;
      an electronic UID reader configured to read the electronic UID;
      an indicia capturing device configured to capture an image of the machine readable indicia and transmitting the image to an external vision processor along with the electronic UID;
      an external reader configured for reading the machine readable indicia;
      a comparator configured for comparing the UID from the electronic component with the machine readable indicia UID;
      a communication device configured for communicating results of comparison of the UIDs to a point of issuance;
      a reader configured for reading the UID and/or the machine readable indicia UID at various controlled access points throughout the property; and
      a database in electronic communication with the reader,
   wherein access is determined by the interpreting the database for each UID.

11. The system according to claim 10, wherein the electronic component is an RFID tag.

12. The system according to claim 10, wherein in addition to the UID and user identity, a user validation is also captured and transmitted to the database.

13. The system according to claim 10, wherein the user validation is a user's signature applied to the card.

14. A card access system for managing access control of a property, the system comprising:

an access card, comprising:
- an electronic component comprising a unique identifier (UID);
- a variable machine readable indicia containing the UID; and
- a signature zone; and a validation device, comprising:
- an access card reader configured to read the electronic component UID and the machine readable indicia UID at various controlled access points throughout the property, the card reader comprising an electronic component UID reader configured to read the electronic component UID and a machine readable indicia reader configured to read the machine readable indicia UID;
- a comparator configured for comparing the electronic component UID to the machine readable indicia UID; and
- a communication device configured to communicate the UID, along with a user identity and access rights to a database, wherein access is determined by interpreting the database for each UID.

15. The system according to claim 14, wherein the machine readable indicia UID is a card identification number.

16. The system according to claim 15, wherein the access card reader comprises a printer for printing on the access card.

17. The system according to claim 16, wherein the card identification number is printed on the access card by the printer of the access card reader.

18. The system according to claim 14, wherein the access card reader comprises a printer for printing on the access card.

19. The system according to claim 14, wherein at least some features of the access card are printed at a purchase/issue location.

20. The system according to claim 14, wherein at least some features of the access card are printed at an access terminal.

* * * * *